March 28, 1950

T. M. FERRILL, JR 2,501,668

AIRCRAFT LANDING SYSTEM

Filed Jan. 29, 1944

INVENTOR
THOMAS M. FERRILL, JR.
BY
Herbert H. Thompson
his ATTORNEY.

March 28, 1950 — T. M. FERRILL, JR — 2,501,668
AIRCRAFT LANDING SYSTEM
Filed Jan. 29, 1944 — 4 Sheets-Sheet 3

INVENTOR
THOMAS M. FERRILL, JR.
BY
his ATTORNEY.

March 28, 1950 T. M. FERRILL, JR 2,501,668
AIRCRAFT LANDING SYSTEM
Filed Jan. 29, 1944 4 Sheets-Sheet 4

INVENTOR
THOMAS M. FERRILL, JR.
BY
Herbert H. Thompson
his ATTORNEY.

Patented Mar. 28, 1950

2,501,668

UNITED STATES PATENT OFFICE 2,501,668

AIRCRAFT LANDING SYSTEM

Thomas M. Ferrill, Jr., Hempstead, N. Y., assignor to The Sperry Corporation, a corporation of Delaware Application January 29, 1944, Serial No. 520,209

31 Claims. (Cl. 343—109)

This invention relates, generally, to apparatus for radiating radio beams in a manner to form a landing path for aircraft by the intersection of two equisignal surfaces, and is particularly directed to improved directional radio transmitting apparatus which may be positioned remote from the landing point of the aircraft. For this purpose radio beams form two curved equisignal surfaces intersecting to define a landing path and having radiated energy concentrated along their intersection.

A major object of the invention is to provide a landing path by the intersection of two conically-shaped equisignal surfaces of electromagnetic energy, the energy being concentrated along the intersection.

Another object of the invention is to provide an improved directional radio transmitting apparatus for radiating energy to form an equisignal cone.

A further object of the invention is to provide an improved directional radio transmitting apparatus for radiating a conically-shaped beam from a dipole antenna array connected by feeders of equivalent length to a transmitter for generating a radio frequency energy of a selected wavelength.

A further object of the invention is to provide a dipole antenna array having a conically-shaped radiation pattern.

A still further object of the invention is to provide an antenna array having a directonal axis in which maximum radiation is concentrated along one side of said axis.

Other objects and advantages of the invention will become apparent from the following specification taken in connection with the accompanying drawings wherein.

Most of the development of instrument landing systems using equisignal surfaces has utilized a vertical equisignal plane, usually referred to as a localizer equisignal plane, and a glide path equisignal plane intersecting the localizer plane to define a landing path. Systems of this type have a disadvantage in that it is necessary for the transmitting antenna for the glide path plane to be located in the vicinity of the contact point which is the point at which the landing path intersects the runway. In order to avoid this difficulty it has been proposed to produce a pair of mutually perpendicular equisignal planes, both of which are inclined with respect to a vertical plane through a landing path. These equisignal planes may be produced by energy radiated from antennas located remotely from the contact point and even beyond the landing area. A system of this type is described in detail in copending application S. N. 663,060, filed April 18, 1946, a continuation of application S. N. 511,286, filed November 18, 1943, in the names of Russell H. Varian, and Thomas M. Ferrill, Jr., which parent application was abandoned December 23, 1947.

According to the present invention the transmitting system for defining a landing path includes a pair of antenna systems remotely located with respect to the contact point. However, instead of defining the landing path as a line formed by the intersection of two equisignal planes, the landing path is defined by the line representing the intersection of two curved equisignal surfaces, such as surface sections of generally conical shape.

This is accomplished by radiating a pair of equisignal cones from opposite sides of the longitudinal axis of the runway intersecting in a line extending upwardly from the runway and in the direction of its longitudinal axis. The conically-shaped beams are not merely lobes of electromagnetic energy, but have patterns in which the maximum radiation represents a conically-shaped surface and weaker radiation is present along the axis of the cone.

The antennas for producing these conically-shaped beams may be dipole arrays having a plurality of elements spaced along a directional axis at distances equal to the product of a half wavelength or a quarter wavelength multiplied by the secant of half of the apex angle of the desired cone. In the case of the half wavelength factor, cones of energy are emitted from the antenna in opposite directions along the directional axis, where as in the case of the quarter wavelength factor the energy is radiated in only one direction along the axis. In order to concentrate the radiated energy toward one side of the directional axis and along the intersection of the two equisignal cones which form a landing path, the elements may be angularly disposed transversely of the directional axis thereby reducing radiation toward one side of the axis and increasing it toward the other.

The transmitting system includes two antenna arrays. Each of these arrays is driven by two radio frequency transmitters of frequencies which correspond to the wavelength of the elements as determined by their spacing to produce a desired conical beam. If the elements are spaced exactly a quarter wavelength for a particular frequency, they must be driven at a higher frequency in order to radiate a conically-shaped pattern. The magnitude of this higher frequency is, as described above, a function of the apex angle of the cone, the higher the frequency the larger the apex angle.

The two radio frequencies supplied to each antenna are closely related to produce conical radiation patterns, one of which has a slightly larger apex angle than the other. In this manner the conically-shaped radiation patterns are arranged coaxially or in nested relation with respect to the directional axis of the antenna to form a conically-shaped equisignal surface between the two cones. The antenna arrays are so arranged that the cones intersect in a line extending upwardly from and in the direction of the longitudinal axis of the runway. The direction of the cones is further arranged to provide the proper angle for the landing path with respect to the runway.

Figure 1:
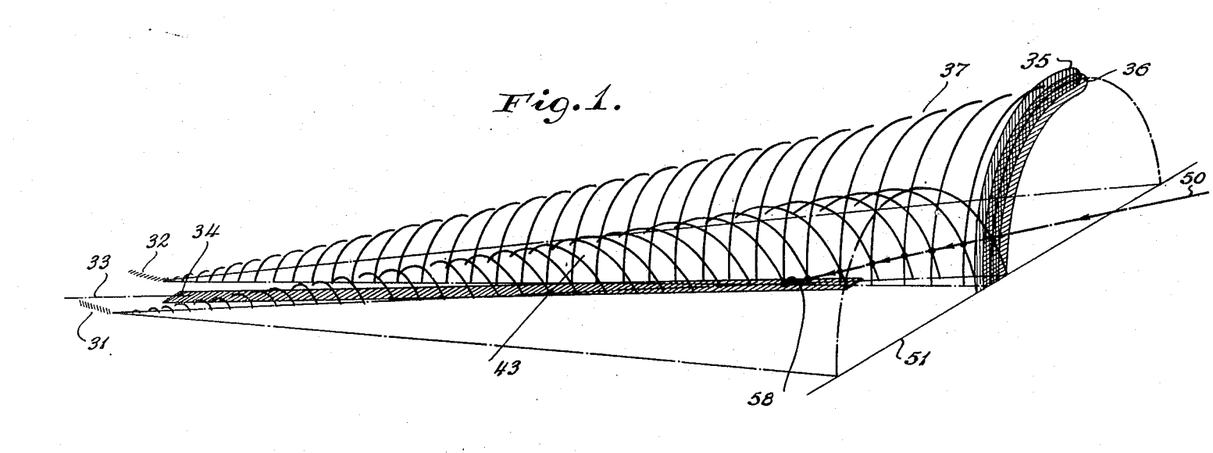
Fig. 1 is a perspective illustration of radio beams forming conically-shaped equisignal surfaces intersecting to define a landing path for directing aircraft to a contact point on a runway.
Figure 2:
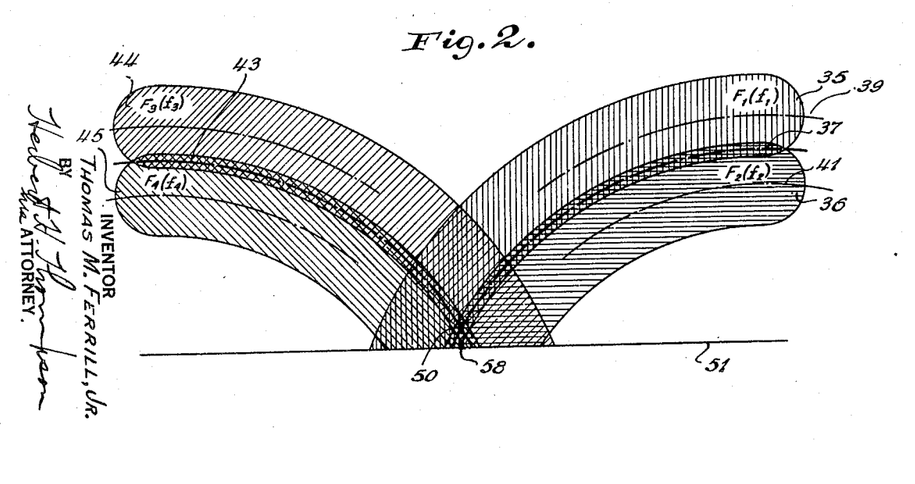
Fig. 2 is a view representing a cross section of the radio beams shown in Fig. 1 in which the particular beam arrangement and the concentration thereof along the intersection of the equisignal cones is shown in greater detail.

As shown in Fig. 1, a pair of directional antenna arrays 31 and 32 are arranged on opposite sides of a longitudinal axis 33 of a runway 34 for which a landing path is to be established. The antenna system 32 radiates a pair of beams 35 and 36 which are conically shaped, having a cross-section as shown in Fig. 2, and are arranged in nested relation so their overlapping portions form a conically-shaped equisignal surface 37 therebetween. The maximum radiation of the two beams from antenna 32 may be considered as center lines 39 and 41 of the beams 35 and 36, respectively. Equisignal surface 37 is that surface at which the intensity of each of the beams 35 and 36 is equal. The manner in which these two beams are radiated from the same antenna will be hereinafter described in detail.

Fig. 1 shows the conically-shaped equisignal surface 37 in its relation to the runway 34, and a similar conically-shaped equisignal surface 43 that is formed between two beams 44 and 45 (Fig. 2) which are radiated from the antenna 31.

Figure 3:
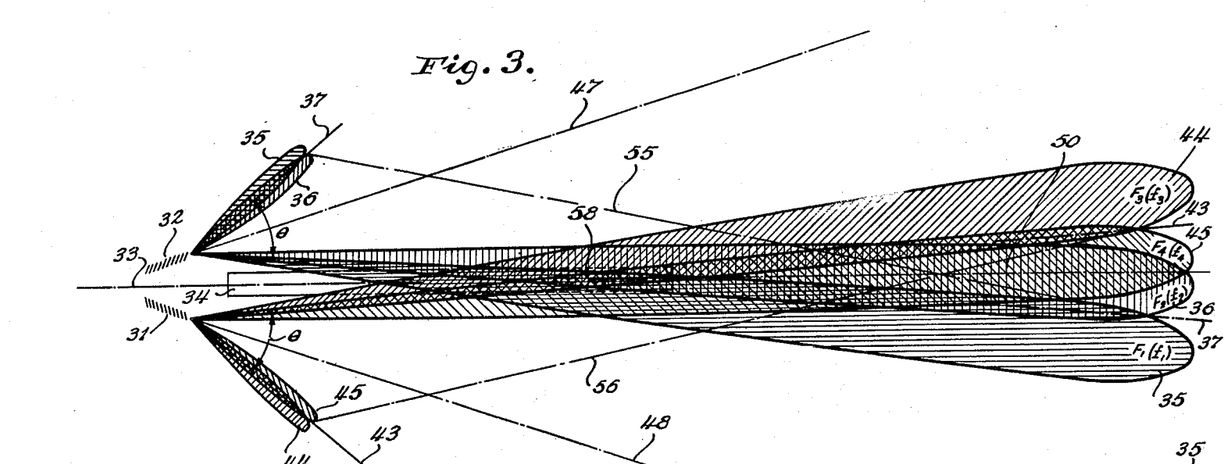
Fig. 3 is a plan view of a landing area showing the relation of antennas with respect to a runway, and an outline of radio beams forming the landing path for directing aircraft to the runway.

As shown most clearly in Fig. 3, the beams 35 and 36 radiated from the antenna 32 are concentrated toward one side of directional axis 47 of the antenna 32 to direct most of the radiated energy along landing path 50 that is formed by the line of intersection between the two conically-shaped equisignal surfaces 37 and 43. Although the beams radiated from the antennas 31 and 32 are not complete cones, in the sense that cones are complete surfaces of revolution, they are substantially conically-shaped surfaces insofar as that portion above the ground line 51 is concerned. The particular conical beams shown in Figs. 1 to 3 inclusive, are not right cones for the reason that greater energy is radiated along the side of the directional axes which is toward the landing path. The equisignal cones therefore take a shape similar to oblique conically-shaped surfaces having bases which may be represented by lines 55 and 56 (Fig. 3). The manner in which the energy is concentrated toward one side of the directional axes 47 and 48 will be more particularly described in connection with the detailed description of the antenna systems.

It will be apparent from Figs. 1 and 3 that the directional axes 47 and 48 diverge with respect to the longitudinal axis of the runway. The purpose of this divergence is to provide for the intersection of the conically-shaped equisignal surfaces 37 and 43 at a point 58 corresponding to the contact point for an aircraft landing on the runway 34. The line of intersection of the two equisignal surfaces projects upwardly from the contact point 58 and along the longitudinal direction 50 of the runway 34.

Figure 4:
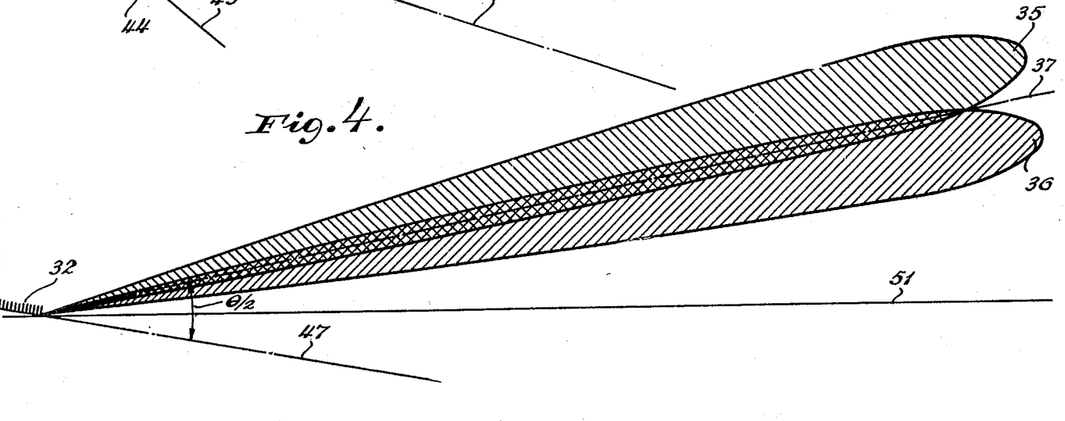
Fig. 4 is a side elevation showing the position of the antenna and a vertical section through the axis of the radio beams emitted from said antenna to form an equisignal cone.

In order that the particular portions of the conically-shaped equisignal surfaces 37 and 43 along the landing path 50 will be inclined at substantially the same angle entirely along the landing path, the directional axes 47 and 48 of the antenna systems 31 and 32 are directed downwardly as they diverge from the runway. As shown in Fig. 4, the directional axis 47 of the antenna 32 is directed downwardly below the ground line 51 so the angle formed between the equisignal surface 37 and the ground is substantially less than the angle between equisignal surface 37 and the directional axis 47, which latter angle corresponds to half of the apex angle $\theta$ that represents the apex angle of the conically-shaped equisignal surfaces.

Since the axes of the conically-shaped beams as well as the conically-shaped equisignal surfaces are directed downwardly as they diverge from the runway, the portions of the conical beams and equisignal surfaces which remain above the ground are substantially less than half cones. Since the energy radiated from the antennas is concentrated along one side of their respective directional axes, the major portion of the energy is concentrated along the landing path. Since less than half the entire cone is above the ground, and the energy radiated from the antenna is concentrated in less than half of that portion of the cone which is above the ground, most of the radiated energy is concentrated in less than one-fourth the complete conical surface representing the maximum radiation pattern of the antenna in free space.

In order to produce the radio beams necessary for defining the landing path, as described above, antenna systems for producing conical radio beams as well as conically-shaped equisignal surfaces were developed. As previously mentioned the apex angle of the conically-shaped equisignal surfaces is considered as the angle $\theta$. The apex angles of the inner and outer conically-shaped radio beams will hereinafter be referred to as $\theta_1$ and $\theta_2$, respectively.

Figure 5:
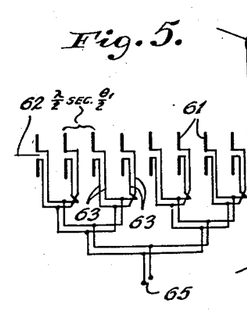
Fig. 5 is a schematic diagram of an antenna array together with its feeder connections for producing a conically-shaped radio beam according to the invention.

One antenna arrangement for producing conical radio beams is shown in Fig. 5. This antenna includes an array of a plurality of dipole elements 61, 61, arranged parallel to each other and transversely of directional axis 62 which may correspond to one of the directional axes 47 or 48 shown in Fig. 3. These dipole elements are spaced along the directional axis 62 at distances (d) corresponding to the product of half of the wave-length ($\lambda$) of the radio frequency energy supplied to them, multiplied by the secant of half of the apex angle ($\theta_1$) of the desired conically-shaped beam. This may be expressed by the equation:

$$d = \frac{\lambda}{2} \sec \frac{\theta_1}{2} \quad (1)$$

In most directional dipole antenna arrays heretofore used, it has been desirable to have the radiation pattern more or less independent of frequency. For this reason, the feeders for the various dipole elements have been designed to adjust the phase of energy supplied to the various elements to compensate for changes in frequency so the directional pattern is not affected by frequency variations.

A dipole antenna array, such as that shown in Fig. 5, having a conically-shaped radiation pattern is critical of frequency, because the apex angle of the conical pattern depends upon the frequency. Therefore, it is desirable to excite the individual dipole elements in a manner such that the phase relation of exciting energy is the same regardless of frequency.

To accomplish this the dipole elements 61, 61 are supplied with radio frequency energy by feeders 63, 63 of equivalent length which are so connected that the radio frequency energy from a source 65 is supplied in phase opposition to adjacent elements spaced along the longitudinal axis 62 at distance $d$.

Since the feeders 63, 63 are of equivalent lengths, they have substantially the same time delay characteristics. Thus, the same time is required for energy to be supplied by the feeders from the source 65 to each of the elements of the antenna array. In other words, energy generated at the source 65 at any instant is supplied simultaneously to each of the dipole elements because the same time interval is required for the energy to travel along the feeders which are of uniform length.

The equivalent length feeders, therefore, provide the same phase relation for energy supplied to the respective elements regardless of the frequency of the energy. In a symmetrical feeder system of this type, the losses in the energy supplied to each element are the same. This uniformity in phasing and loss considerations reduces distortions that might otherwise occur in the conically-shaped radiation pattern, and also facilitates accurate prediction as to the exact shape of the pattern.

Figure 6:
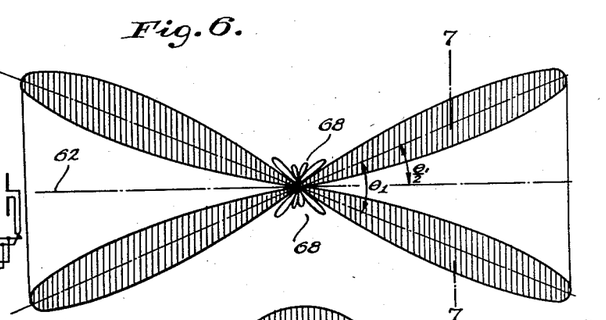
Fig. 6 is a plan view showing an outline of the conically-shaped radiation pattern of the antenna shown in Fig. 5.
Figure 7:
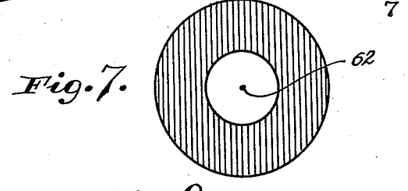
Fig. 7 illustrates a sectional view of the radiation pattern as taken on line 7—7 of Fig. 6.

As is well known, elements spaced along an axis similar to that shown in Fig. 5, but at distances corresponding to half the wavelength of the exciting energy will provide maximum radiation along their directional axis. However, by applying a higher frequency or by lengthening the distance between the elements the maximum radiation takes the form of a cone which is symmetrical about the axis 62 as shown in Figs. 6 and 7. When the elements are spaced according to the distance $d$ energy is radiated from the antenna in both directions along the axis 62, as shown in Fig. 6.

The radiation pattern may be described as a hollow conically shaped beam having a minimum radiation along its axis. The thickness of the beams depends upon the number of elements in the antenna array as well as upon the wavelength used. As shown in the drawing these conically-shaped beams project in both directions along the axis 62 and substantially no energy is radiated directly along that axis, as shown most clearly in Fig. 7. In addition numerous minor lobes 68, 68 may be present but the energy radiated along these minor lobes is not sufficient to be significant for present purposes.

Figure 8:
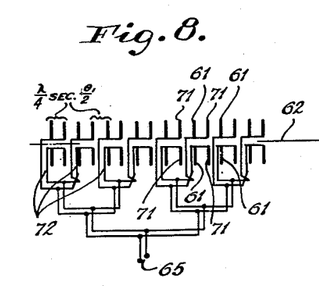
Fig. 8 is a schematic diagram of an antenna array for producing a unidirectional conically-shaped radio beam according to the invention.

If desired the antenna array may be modified to radiate in only one direction along the axis 62 by doubling the number of elements, reducing the spacing by half, and feeding energy from source 65 to adjacent elements in phase quadrature relation. This arrangement is shown in Fig. 8 in which elements 61, 61 are spaced distance $d$ and elements 71, 71 are interposed at mid-points therebetween. Hence, the antenna array includes a plurality of elements arranged in parallel arrangement transversely of axis 62 and spaced along that axis at a distance $d'$ equal to one-fourth of the wavelength $\lambda$ of the radio frequency energy from source 65 multiplied by the secant of half of the apex angle $\theta_1$ of the conically-shaped beam.

Feeders 72, 72 connecting the elements 61 are of uniform length arranged in substantially the same manner as feeders 63, 63 in Fig. 5. However, elements 71, which have been added in Fig. 8, are driven in phase quadrature relation to adjacent elements 61 by connecting lines 70, 70 between elements 61 and elements 71. It will be apparent from this arrangement that each of the elements of the antenna array is supplied with radio frequency energy from the source 65 that is in phase quadrature relation to the energy supplied to adjacent elements.

Figure 9:
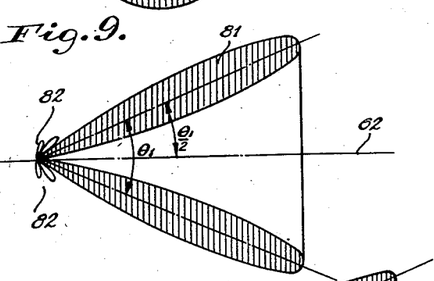
Fig. 9 is a plan view of an outline of the radiation pattern of the antenna array shown in Fig. 8.

Stated another way the energy supplied to successive elements of the antenna array is advanced in phase by 90 degrees. This has the effect of cutting off radiation in one direction since the element 71, interposed between the elements 61, are in phase with energy radiated in one direction but of opposite phase to that radiated in the opposite direction. Therefore the amount of energy radiated along the axis 62 is eliminated in one direction and increased in the opposite direction, as shown in Fig. 9. The proportions of conically-shaped beam 81 are substantially the same as that shown in Fig. 6 and the cross section is identical with that shown in Fig. 7. Minor lobes 82, 82 may again be present but not of sufficient magnitude to be significant.

Figure 10:
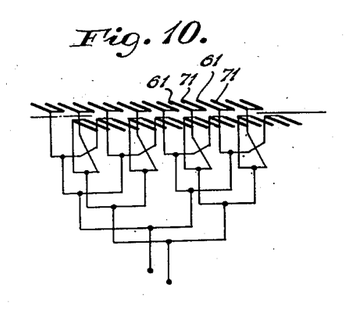
Fig. 10 is a schematic plan view of an antenna array having a conically-shaped radiation pattern in which the energy emitted is concentrated along one side of a directional axis.

Both of the antenna systems shown in Figs. 5 and 8 have radiation patterns as shown in Figs. 6 and 9 which radiate energy substantially equally along both sides of directional axis 62. Since it is desirable, as explained above, to concentrate the major portion of radiated energy along the landing path, it is desirable to concentrate energy radiated from the antennas toward one side of the directional axis 62. To accomplish this the dipole elements 61 and 71, shown in Fig. 8 may be angularly disposed with respect to the directional axis 62 in a manner shown in Fig. 10. The feeders for the elements shown in Fig. 10 are the same as those shown in Fig. 8 to provide energy from the source 65 in phase quadrature relation to successive elements of the antenna array.

As is known, dipole antenna elements do not radiate in a direction lengthwise of the individual elements. By arranging the elements at an acute angle to the directional axis 62 radiation is decreased along one side of the axis and correspondingly increased along the other side. Preferably the angle at which the elements are arranged to the directional axis 62 corresponds approximately to one-half of the apex angle of the conical beam pattern. This reduces to a minimum the radiation of energy along one side of the directional axis and hence correspondingly increases the radiation along the opposite side thereof.

The arrangement of the dipole elements at an acute angle with respect to the directional axis 62 results in an oblique conical beam pattern 83 (Fig. 11) which is still substantially symmetrical about the axis 62, although it may be shifted slightly due to the angular disposition of the dipole elements. However, this shifting of the axis of symmetry is so small as to be immaterial and the directional axis of the conical beam may be considered as the axis 62 for all practical purposes. It will be observed, however, that the major portion of the energy radiated from the antenna is now directed along one side of the directional axis. The oblique conical beam shown in Fig. 11 as being radiated from the antenna array in Fig. 10 is substantially the same as each of the beams 35, 36, 44 and 45 shown in Figs. 1 to 3 inclusive.

The elements of the antennas 31 and 32 are angularly disposed in opposite directions with respect to their respective directional axes 47 and 48, in a manner such that the energy radiated from these antennas is concentrated along the longitudinal direction 33 of the runway 34 so the energy is concentrated along the landing path 50.

Figure 11:
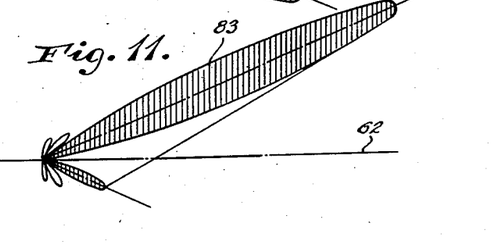
Fig. 11 is a plan view of an outline of radiation pattern of the antenna array shown in Fig. 10.

The system for defining a landing path as shown in Figs. 1 to 4 inclusive, includes apparatus for radiating a pair of conically-shaped beams, such as the one shown in Fig. 11, arranged in nested relation from opposite sides of a runway in order to form a pair of conically-shaped equisignal surfaces that will intersect to define a landing path. Each pair of nested conical beams may be radiated from the same antenna by periodically changing the radio frequency of the energy supplied to the antenna for exciting the same. It is also necessary to modulate each of the beams in a manner such that a receiver in an airplane may identify the respective beam to ascertain its location with respect to each of the equisignal surfaces and their intersection.

It will be apparent that a pair of antenna arrays such as the one shown in Fig. 10 could be arranged to radiate their beams in nested relation. For example, two arrays may be positioned adjacent each other and excited to radiate conical beams having different apex angles, the beams overlapping to form a conically-shaped equisignal surface. Also, two dipole arrays might be arranged in spaced relation along a common directional axis to radiate a pair of conically-shaped beams having substantially the same apex angle. By appropriately spacing the arrays along their directional axes, the conical beam will overlap to form a conically-shaped equisignal surface.

A preferred arrangement for producing the conically-shaped equisignal surfaces is to connect a dipole array such as that shown in Fig. 10 alternately to transmitters for generating energy of two different radio frequencies. When the array is connected to the transmitter generating the higher frequency energy, it will radiate a conical beam having an apex angle ($\theta_2$). When the array is connected to the lower frequency transmitter, it radiates a conical beam nested within the larger beam and having a smaller apex angle ($\theta_1$).

Figure 12:
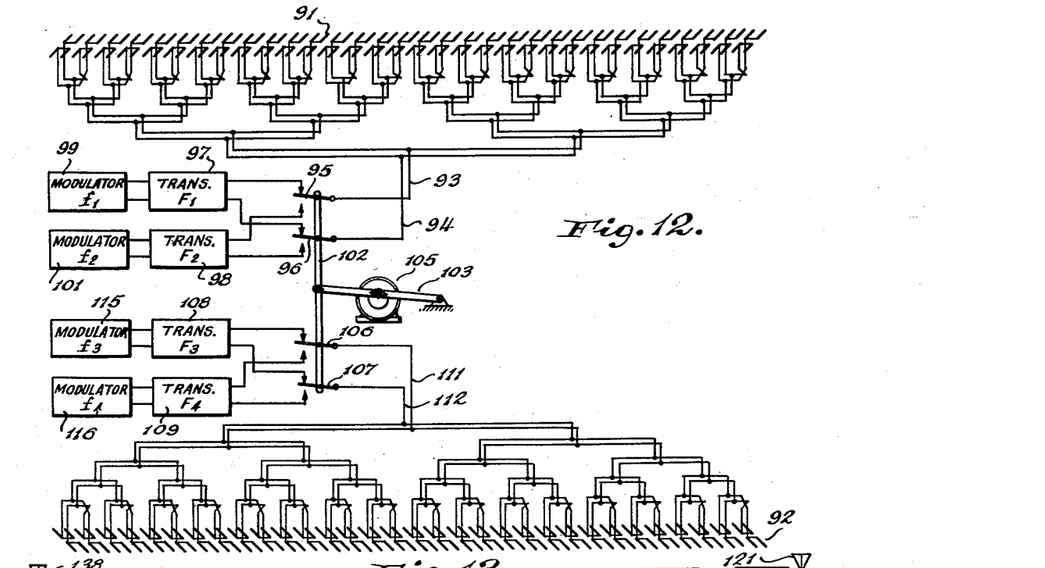
Fig. 12 is a schematic diagram of a transmitting system including antenna arrays in their preferred form for radiating beams to define a landing path by the intersection of two conically-shaped equisignal surfaces as shown in Figs. 1 to 4 inclusive.

Transmitting apparatus for producing a pair of conically-shaped equisignal cones in this manner is shown in Fig. 12 in which a pair of similar antenna arrays 91 and 92, each of which consists of 64 dipole elements, arranged as shown in Fig. 10 at distances along their directional axes dependent on the wavelength of energy supplied thereto, and angularly disposed with respect to the directional axes of the two arrays to concentrate radiated energy along one side thereof, as described in connection with Fig. 10. The dipole elements of the two arrays are angularly disposed in opposite directions to concentrate radiated energy toward their intersection so maximum energy will lie along the landing path.

The feeding systems include feeders of uniform length for supplying energy to each element having phase quadrature relation with respect to energy supplied adjacent elements in the same manner as that described in connection with Figure 8.

The feeder system for the antenna array 91 is connected by leads 93 and 94 to periodically operated switches 95 and 96 that connect the pair of leads, 93 and 94, alternately to transmitter 97 generating a radio frequency $F_1$ and a transmitter 98 generating radio frequency $F_2$. Each of the transmitters 97 and 98 is modulated at preferably audio frequency $f_1$ and $f_2$ by modulators 99 and 101, respectively. The switches 95 and 96 are operated by member 102 that is rapidly reciprocated by a lever 103 driven by a motor 105 to continuously switch the connections for antenna 91 between transmitter 97 and 98 so two frequencies $F_1$ and $F_2$ are radiated alternately by the antenna 91.

These two frequencies $F_1$ and $F_2$ differ sufficiently to provide two conical beams from the antenna 91. The higher frequency radiates a conical beam having a greater apex angle than that radiated by the smaller frequency. These may correspond to the beams 35 and 36 in which the radio frequency energy producing beam 35 is higher than that producing beam 36 since beam 35 has a greater apex angle than that of beam 36.

In a similar manner the reciprocating member 102 operates switches 106 and 107 to continuously switch energy from transmitters 108 and 109 having frequencies F₃ and F₄ to leads 111 and 112 for alternately supplying radio frequency energy of frequencies F₃ and F₄ to the antenna array 92. Transmitters 108 and 109 are modulated preferably at audio frequencies ($f_3$) and ($f_4$) as by modulators 115 and 116 respectively. Considering the antennas 91 and 92 as being positioned to correspond respectively to antennas 32 and 31, in Figs. 1 and 3, the conical beams 35, 36, 44 and 45 may be produced by energy having radio frequencies F₁, F₂, F₃ and F₄ and modulated by audio frequencies $f_1$, $f_2$, $f_3$ and $f_4$, respectively.

Since two conical beams arranged in nested relation are provided by exciting the same antenna at two different frequencies, the necessity for properly phasing the excitation of the various dipole elements independently of frequency becomes even more important. The preferred arrangement of these equivalent length feeders for the antenna arrays is shown in Figure 12. However, a similar result may be accomplished by connecting individual transmission lines of equivalent length from the switches to each of the dipole elements in the antenna array 91.

Although only two of the four conical beams are radiated at the same time, one from antenna 91 and one from 92, they are switched sufficiently rapidly that the "on" and "off" periods do not affect the resultant operation of the systems.

A receiver may respond to the radio frequency energy and its audio modulation to determine the relative strength of the beams of each pair thereby ascertaining its direction and amount of displacement with respect to the equisignal cone. This may be used to actuate one pointer of a cross-pointer meter used to indicate the displacement of the aircraft from the intersection of the equisignal cones which defines the landing path.

One arrangement of receivers which may be used in connection with the landing system described above, is shown schematically in Fig. 13. Antenna 121 is connected to a frequency converter 122 which is supplied by a local oscillator 123 of a frequency corresponding to the average of the two radio frequencies F₁ and F₂. This average frequency of the local oscillator mixes with received energy and produces the same beat frequency with respect to energy received from beams 35 and 36 having radio frequency energy F₁ and F₂. The beat frequency corresponds to half of the difference of the frequencies F₁ and F₂. Since the frequencies F₁ and F₂ result in the same intermediate frequency, a single intermediate frequency amplifier 124 may be connected to the frequency converter 122 for amplifying signals received from both of the beams 35 and 36.

Figure 13:
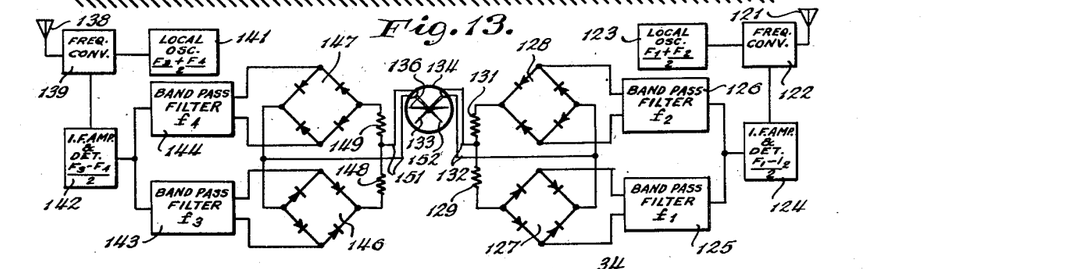
Fig. 13 is a schematic diagram of a receiving and indicating system for aircraft which may be used in connection with the transmitting apparatus shown in Fig. 12 to follow the landing path for an instrument landing.
Figure 14:
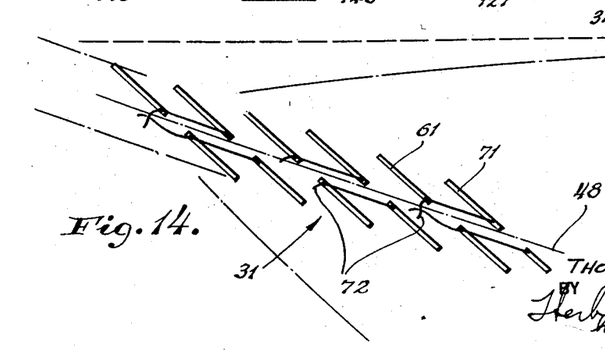
Fig. 14 is an enlarged plan view of a portion of the antenna array used in the transmitting system shown in Fig. 12.

In order to distinguish energy received from these two beams the intermediate frequency signal is detected and the resultant modulation signal is passed through a pair of band-pass filters 125 and 126 that are tuned to audio frequencies $f_1$ and $f_2$, respectively. The outputs of the filters 125 and 126 are connected in a double-bridge rectifier circuit including bridge rectifiers 127 and 128 which are connected in series with resistances 129 and 131, respectively. In this manner currents in leads 132 that are connected to one pointer 133 of a cross-pointer indicator 134 move the pointer upwardly or downwardly depending upon whether the audio frequency $f_1$ or $f_2$ is stronger. Thus, when the pointer 133 corresponds with reference 136 the pilot knows that he is receiving equal strength signals from the beams 35 and 36 and hence is somewhere on the equisignal surface 37.

In a similar manner a second antenna 138, carried by the aircraft, is connected to a frequency converter 139 which is supplied from a local oscillator 141 with a frequency corresponding to the average frequency of the beams 44 and 45 which is the average of frequencies F₃ and F₄, respectively. This forms a beat frequency corresponding to half the difference of the frequencies F₃ and F₄, which is supplied to intermediate frequency amplifier and detector 142 that amplifies energy received from the two beams equally.

The output of the intermediate frequency amplifier and detector 142 is connected to band-pass filters 143 and 144 which are tuned to audio frequencies $f_3$ and $f_4$, respectively. The outputs of these filters are also connected in a double-bridge rectifier circuit including bridge rectifiers 146 and 147 and resistors 148 and 149 whereby currents in leads 151 deflect the second pointer 152 of the cross-pointer indicator 134 to indicate the position of the aircraft with respect to the equisignal plane 43 as determined by the relative strengths of signals received from the beams 44 and 45.

Since tangents to the conical-shaped equisignal surfaces 37 and 43 along their line of intersection are disposed at angles substantially equal to 45 degrees with respect to the horizontal, the cross-pointer indicator is arranged so that its pointers are normally disposed at 45 degrees with respect to the horizontal.

Summarizing the operation of the system, conically-shaped radio beams are developed by spacing antenna elements along a directional axis at distances corresponding to one-half or one-quarter of the wavelength of energy supplied thereto, multiplied by secant of one-half of the apex angle of the desired cone. By angularly disposing the elements with respect to the longitudinal axis energy radiated therefrom may be concentrated toward one side of the axis. By supplying such an antenna with two slightly different radio frequencies two cones of electromagnetic energy are radiated by the antenna. These cones are arranged in nested relation and define a conically-shaped equisignal surface between them. This surface is positioned between the conically-shaped surfaces of maximum radiation of each of the two conical beams.

An antenna array of this type is set up on each side of the longitudinal direction of a runway to produce a pair of equisignal cones. The directional axes of these two antennas preferably diverge from the longitudinal direction of the runway in a manner such that the equisignal surfaces intersect with the ground and with each other at a point corresponding to the contact point at which aircraft should land on the runway.

In addition the directional axes of the two antenna systems are directed downwardly in a manner such that tangents to their surfaces along the line of intersection extending upwardly from the contact point are disposed at substantially 45 degrees with respect to the horizontal, and are therefore mutually perpendicular.

In this manner a landing path is defined by the intersection of the two conically-shaped equisignal surfaces in such a manner that the displacement measured perpendicularly from each of the two surfaces provides an indication of the aircraft's position or displacement with respect to the landing path. This indication may be made on a cross-pointer meter actuated by receiving apparatus which responds to four conically-shaped radio beams to position a pair of pointers in accordance with the relative displacement of the aircraft from each of the conically-shaped equisignal surfaces. The intersection of the two pointers then indicates the displacement of the aircraft with respect to the landing path as represented by a reference point on the meter.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An antenna array having a predetermined axis and a conically-shaped radiation pattern for a selected wavelength of electromagnetic energy comprising a plurality of parallel elements equally spaced along an axis at distances proportional to the product of half of said selected wavelength and the secant of half of the apex angle of said pattern, whereby said conically-shaped radiation pattern is orientated at a predetermined angle other than 0° with respect to said axis.

2. An antenna array having a conically-shaped radiation pattern for a selected wavelength of electromagnetic energy, comprising a plurality of parallel elements equally spaced along an axis and extending transverse said axis at distances greater than half of said selected wavelength but less than said selected wavelength, and feeders of equivalent lengths extending from a common power input point to said elements for supplying to said elements radio frequency energy characterized by said selected wavelength, the feeders for alternate elements being arranged to supply said alternate elements with oppositely phased energy.

3. An antenna array, comprising a plurality of dipole elements equally spaced along an axis and disposed in mutually parallel relation at an acute angle to said axis, a variable frequency, electromagnetic energy generator, equivalent length conductors coupling said generator to said separate elements of said array to maintain constant the phasal relationship between said elements independent of varying frequency input thereto.

4. An antenna array for radiating electromagnetic energy of a selected wavelength in a conically-shaped pattern comprising a plurality of antenna elements spaced along a directional axis, and a plurality of feeders for supplying radio frequency energy to said elements, said feeders being so connected to said elements that the energy supplied to each element is in phase opposition to the energy supplied to an adjacent element for concentrating radiated energy about and in the direction of said directional axis, said elements being spaced along said directional axis at distances greater than half of said selected wavelength but less than said selected wavelength to provide a conically-shaped pattern of maximum radiation about said directional axis.

5. An antenna array as defined in claim 4 in which said elements are disposed at acute angles to said directional axis for further concentrating said radiated energy toward one side of said directional axis.

6. An antenna array having a conically-shaped radiation pattern for a selected wavelength of electromagnetic energy comprising a plurality of parallel elements equally spaced along an axis at distances less than one-half of said selected wavelength but greater than one-fourth of said selected wavelength, and means for equally energizing said elements in successive 90° phase displacement relations, whereby energy components from said elements travel in phase additive relation along a line at an acute angle to said axis.

7. An antenna array having a predetermined axis and a conically-shaped radiation pattern for a selected wavelength of electromagnetic energy comprising a plurality of parallel elements equally spaced along an axis at distances proportional to the product of one-fourth of said selected wavelength and the secant of half of the apex angle of said pattern, whereby said conically-shaped radiation pattern is oriented at a predetermined angle, other than 0°, with said axis.

8. An antenna array having a predetermined axis and a conically-shaped radiation pattern for a selected wavelength of electromagnetic energy comprising a plurality of separate dipole elements angularly disposed to an axis at points spaced along said axis at distances determined by the secant of half the apex angle of said pattern greater than one-fourth of said selected wavelength, whereby said conically-shaped radiation pattern is oriented at a predetermined angle with said axis.

9. An antenna array having a conically-shaped radiation pattern for a selected wavelength of electromagnetic energy comprising a plurality of dipole elements arranged perpendicularly to an axis and spaced along said axis at distances greater than one-fourth of said selected wavelength, said distances being a function of the secant of half the apex angle of said pattern.

10. An antenna array for radiating electromagnetic energy of a selected wavelength in a conically-shaped pattern comprising a plurality of antenna elements spaced along a directional axis, and a plurality of feeders for supplying radio frequency energy to said elements, said feeders being so connected to said elements that the energy supplied to each element is in phase quadrature to the energy supplied to an adjacent element for concentrating radiated energy about and in one direction along said directional axis, said elements being spaced along said directional axis at distances greater than one-fourth of said selected wavelength to provide a conically-shaped pattern of maximum radiation in said one direction about said directional axis.

11. An antenna array as defined in claim 10 in which said elements are disposed at an acute angle to said axis for further concentrating radiated energy toward one side of said directional axis.

12. An antenna array for producing a conically-shaped radiation pattern when excited by radio frequency energy of a selected wavelength comprising a plurality of elements spaced at intervals greater than said wavelength, and equivalent-length feeders connected to said elements for coupling and exciting electromotive force in phase to each of said elements.

13. In a directive radio transmitting system, the combination of a multiple element linear array so arranged as to produce maximum radiation strength in a direction coincident with a directional axis when excited at a certain frequency, and means for exciting said array at a selected frequency higher than said certain frequency to produce a conically-shaped pattern of maximum radiation.

14. A radio transmitting system for producing a conically-shaped beam of electromagnetic energy, comprising a transmitter for generating energy of a selected wavelength, an antenna having a plurality of separate radiating elements spaced along an axis at distances greater than half of said selected wavelength and different from an integral multiple of half said selected wavelength, and equivalent length feeders for supplying energy from said transmitter to said elements of said antenna.

15. A radio transmitting system for producing a conically-shaped beam of electromagnetic energy, comprising a transmitter for generating energy of a selected wavelength, an antenna having a plurality of elements spaced along an axis at distances greater than one-fourth of said selected wavelength, and equivalent length feeders for supplying energy from said transmitter to alternate elements of said antenna, whereby phasal relationships established among said alternate elements are maintained constant, said feeders being so connected as to maintain successive ones of said alternate elements energized in opposite phase relationships.

16. A radio transmitting system for producing a conical beam of electromagnetic energy, comprising a transmitter for generating energy of a selected wavelength, an antenna having a plurality of elements spaced along an axis at distances greater than one-fourth of said selected wavelength, and feeders for supplying energy from said transmitter in substantially phase quadrature relation to adjacent elements of said antenna.

17. In a landing system, apparatus for defining a landing path comprising a pair of separate multiple dipole antenna arrays, means for supplying separately modulated components of radio frequency energy of two different frequencies to each of said antenna arrays to produce two pairs of distinctively modulated overlapping beams, each pair of beams defining an equisignal surface, said antenna arrays being so positioned symmetrically about a vertical plane that said equisignal surfaces intersect to form a landing path therein.

18. In a landing system, apparatus for defining a landing path comprising a pair of dipole antenna arrays for producing two pairs of conically-shaped beams of radiant energy, said dipole antenna arrays being positioned symmetrically about the vertical plane in which landing guidance is to be provided, and means energizing each of said arrays for producing therethrough two distinctive conically shaped beams of different cone angles, the beams produced by each antenna being arranged in nested relation to form a conically-shaped equisignal surface, the two equisignal surfaces thus formed intersecting to form said landing path.

19. In a landing system, apparatus for defining a landing path comprising a pair of directive antenna systems positioned symmetrically about the vertical plane in which said landing path is to be defined, and means coupled to said antenna systems for so energizing said antenna systems as to produce a pair of curved equisignal surfaces intersecting in a line in said vertical plane to form a landing path, said antenna systems being so arranged that tangents to said surfaces at any point along said line of intersection are angularly inclined relative to said vertical plane.

20. Apparatus for producing a conically-shaped equisignal surface of electromagnetic energy, comprising transmitter means for generating electromagnetic energy of two different wavelengths, and an antenna array having dipole elements spaced at distances greater than half of either of said wavelengths but less than either of said wavelengths and connected to said transmitter means for producing two conically-shaped beams of electromagnetic energy arranged in nested relation and forming a conically-shaped equisignal surface therebetween.

21. Apparatus for producing a conically-shaped equisignal surface of electromagnetic energy of two frequencies, comprising means for generating oscillations of a first frequency, means for generating oscillations of a second frequency, a directive antenna array having radiating elements predeterminedly spaced and fed with energy from a pair of feeder input terminals at substantially equal phase delays, and means for alternately coupling said first generating means and said second generating means to said feeder input terminals to provide periodically varying radiation frequency and radiation pattern of said directive array.

22. A directive energy radiating system comprising: an antenna array; and means coupled thereto for alternately supplying to said array energy of a first frequency and energy of a second frequency; said array comprising more than two radiator elements arranged in consecutive positions along an axis and spaced at spacings different from integral multiples of quarter wavelength to produce a directivity pattern at a first angle to said axis for energy of said first frequency when excited in predetermined phase relations and to produce a directivity pattern at a second angle to said axis for energy of said second frequency when excited in said predetermined phase relations, and means coupling said elements to said energy supplying means for holding said predetermined phase relations among said elements irrespective of the difference of said first and second frequencies.

23. A directive energy radiating system as defined in claim 22, wherein said radiator elements are evenly spaced apart along said axis, each element extending transversely of said axis.

24. A directive energy radiating system as defined in claim 22, wherein the ratio between said first and second frequencies is appreciably less than two.

25. A directive radiating system comprising: an antenna array; and means coupled thereto for supplying to said array energy regularly changing between a first frequency and a second frequency; said array comprising more than two radiator elements regularly spaced along an axis and extending transverse said axis for producing a directivity pattern at a first angle to said axis for energy of said first frequency when excited in predetermined phase relations and for producing a directivity pattern at a second angle to said axis for energy of said second frequency when excited in said predetermined phase relations, and means coupling said elements to said energy supplying means for holding said predetermined phase relations among said elements irrespective of frequency changes between said first and second frequencies.

26. A directive energy radiating system as defined in claim 25, wherein said predetermined phase relations are such that 180° phase relations are provided between selected elements in said array, and the intervals between said selected elements are different from dimensions characterized by an integral number of quarter-wavelengths at one of said frequencies.

27. A directive energy radiating system as defined in claim 25, wherein said coupling means comprise pairs of symmetrical transmission line branches extending from selected junction points to pairs of said antenna elements, and further symmetrical transmission line sections extending from pairs of said selected junction points to a further junction point, in such a way that the energy trasmission phase delay between said further junction point and each of the elements thus connected thereto is equal to the transmission phase delay between said further junction point and any other of said elements.

28. A directive energy radiating system as defined in claim 25, wherein said elements extend transversely of said axis at an acute angle thereto, said elements being parallel, whereby the energy directivity pattern in the plane of said elements is made asymmetrical about said axis.

29. Directive electromagnetic energy radiating apparatus comprising a series of antenna elements spaced along an axis, means for supplying electromagnetic energy to said elements, the phase spacing of said elements being different from the phase relation of energy components fed to them to produce a concentrated directivity pattern and said elements lying in a common plane and being inclined in substantially mutually parallel relations at an acute angle with respect to said axis for concentrating the principal part of said directivity pattern to one side of said axis in said plane.

30. Directive radiant energy apparatus comprising a series of antenna elements spaced along an axis, said elements being parallel and lying in a common plane containing said axis, and means for supplying radio frequency energy to said elements, said elements being fed in a phase progression of lesser phase angles than their phase spacing to provide a substantially conical directivity pattern aimed generally along said axis, and said elements being inclined in a similar sense at acute angles to said axis for enhancing the directivity pattern in said plane to one side of said axis and suppressing the pattern in said plane at the opposite side of said axis.

31. A radiating system comprising an array of at least three dipole elements having their midpoints aligned along an axis, and means for supplying energy of first and second radio frequencies to said elements, said means including a coupling system for suppying to said elements radio frequency energy of a predetermined distribution of component amplitudes, said last-named means comprising means for retaining substantially fixed phase relations among the energy components supplied to said elements independently of frequency of the radio frequency energy passing therethrough, said array including elements supplied with energy components of mutually opposite phase at both of said first and second radio frequencies for suppressing radiation of energy in a region substantially perpendicular to the axis of said linear array of elements.

THOMAS M. FERRILL, Jr.

REFERENCES CITED

The following references are of record in the file of this patent:

UNITED STATES PATENTS

| Number | Name | Date |
|---|---|---|
| 1,683,739 | Stone | Sept. 11, 1928 |
| 1,867,958 | Williams | July 19, 1932 |
| 1,922,115 | Stone | Aug. 15, 1933 |
| 2,245,660 | Feldman et al. | June 17, 1941 |
| 2,268,107 | Bond | Dec. 30, 1941 |
| 2,409,944 | Loughren | Oct. 22, 1946 |

FOREIGN PATENTS

| Number | Country | Date |
|---|---|---|
| 456,838 | Great Britain | Nov. 11, 1936 |

OTHER REFERENCES

Bell Telephone Laboratories Reprint B 194, May 1926, Directive Diagrams of Antenna Arrays by R. M. Foster.